US 6,991,892 B2

(12) United States Patent
Block (10) Patent No.: US 6,991,892 B2
(45) Date of Patent: Jan. 31, 2006

(54) METHODS OF MAKING AN INTEGRATED WAVEGUIDE PHOTODETECTOR

(75) Inventor: Bruce A. Block, Portland, OR (US)

(73) Assignee: Intel Corporation, Santa Clara, CA (US)

(*) Notice: Subject to any disclaimer, the term of this patent is extended or adjusted under 35 U.S.C. 154(b) by 266 days.

(21) Appl. No.: 10/392,363

(22) Filed: Mar. 17, 2003

(65) Prior Publication Data

US 2004/0185386 A1  Sep. 23, 2004

(51) Int. Cl.
*G03F 7/26* (2006.01)

(52) U.S. Cl. .................. 430/321; 385/30; 257/432

(58) Field of Classification Search ............... 430/321; 385/30; 257/432
See application file for complete search history.

(56) References Cited

U.S. PATENT DOCUMENTS

| 5,701,379 A | * | 12/1997 | Takeuchi ................... 385/131 |
| 2003/0108294 A1 | * | 6/2003 | Zheng ......................... 385/39 |
| 2003/0161571 A1 | * | 8/2003 | Davids et al. ............... 385/14 |

* cited by examiner

Primary Examiner—John A. McPherson
(74) Attorney, Agent, or Firm—Fish & Richardson P.C.

(57) ABSTRACT

An integrated waveguide and photodetector which are evanescently coupled, and methods of making such integrated waveguide and photodetector.

24 Claims, 10 Drawing Sheets

Side Views

Initial Substrate

FIG. 5A

Deposit Detector Material (Ge)

FIG. 6A

Deposit Sacrificial Layer (Si or Silicon Nitride)

FIG. 7A

Pattern/Etch Mesa for Detector

FIG. 8A

Deposit Cladding Material (Oxide)

FIG. 9A

Top Views

Litho/Etch WG Structure

FIG. 21

METHODS OF MAKING AN INTEGRATED WAVEGUIDE PHOTODETECTOR

BACKGROUND

Light propagates in straight line paths known as rays. Rays may be refracted, reflected, and scattered at material interfaces. In a dielectric waveguide, a high index core region may be surrounded by a lower index cladding layer. Rays may be confined in the high index core region by internal reflection at the core/cladding interface. The reflected rays may interfere with each other to form electromagnetic field patterns within the waveguide.

In a waveguide, light may have only certain allowed states called "modes." "Modes" of a waveguide refer to field patterns that propagate in the core region without dispersion, i.e., changing shape. The waveguide could be "single mode" if it only supports one mode. "Multimode" waveguides support many modes. An analogy of a mode may be thought of as a probability function, where the mode is similar to electron shells in atoms. An electron is confined in a shell, just as a photon is found in its mode. By changing the shape of the waveguide, the waveguide mode can no longer be supported, and light may be expelled, directed, steered or "forced" out of the waveguide and into the higher index detector.

A waveguide may guide light to a photodetector. To electrically detect light in a waveguide, the photodetector may absorb radiation, collect photogenerated charge and produce an electric current. To improve detection efficiency, the absorbing detector material is typically placed in contact with the waveguide in a configuration known as "evanescent coupling." A detector coupling efficiency may be improved by including an intermediate "matching" layer between the waveguide core and the absorbing detector material. This configuration may still suffer from scattering loss from the detector material and inefficient coupling due to mode repulsion and guiding in the matching layer.

Performance limits of a phototransistor device are defined by a gain bandwidth product. A phototransistor with high gain may have diminished frequency response or bandwidth. A "fast" phototransistor may have reduced gain or signal. The speed of a phototransistor may be limited by a transit time of the slowest carriers across the detector's active region. A photodetector may be limited by a transit time of the slowest carriers across the detector's active region.

DETAILED DESCRIPTION

An integrated system of a phototransistor or photodiode formed in a photodetector evanescently coupled with a waveguide may provide a relatively fast, compact integrated photodetector. A "phototransistor" may provide gain while a "photodetector" may at best transfer one photon into one electron and one hole. There may be no gain for a photodetector. The phototransistor or photodiode may serve as an element in a logic circuit, which is switched by light.

A relatively high index of refraction waveguide integrated with a phototransistor or photodiode may efficiently couple light into a lossy detector material. The detector material absorbs the light and confines electron hole pairs to a small region within a base 1320 (FIG. 13C) of the phototransistor or intrinsic region of a photodiode. This configuration may allow a smaller area of the base 1320 or intrinsic region and allow faster switching frequency. Furthermore, the configuration may allow an emitter-collector current to be amplified.

Figure 1A:
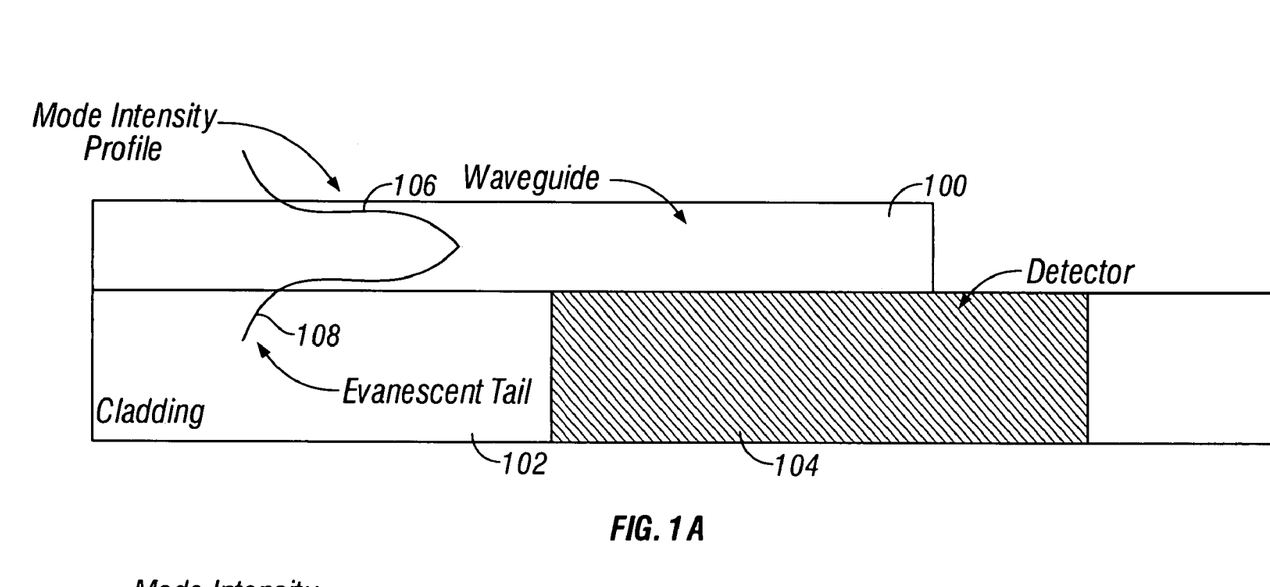
FIGS. 1A–1B illustrate a side view of a waveguide, a cladding layer, a detector and a mode intensity light profile with an evanescent tail propagating through the waveguide.
Figure 1B:
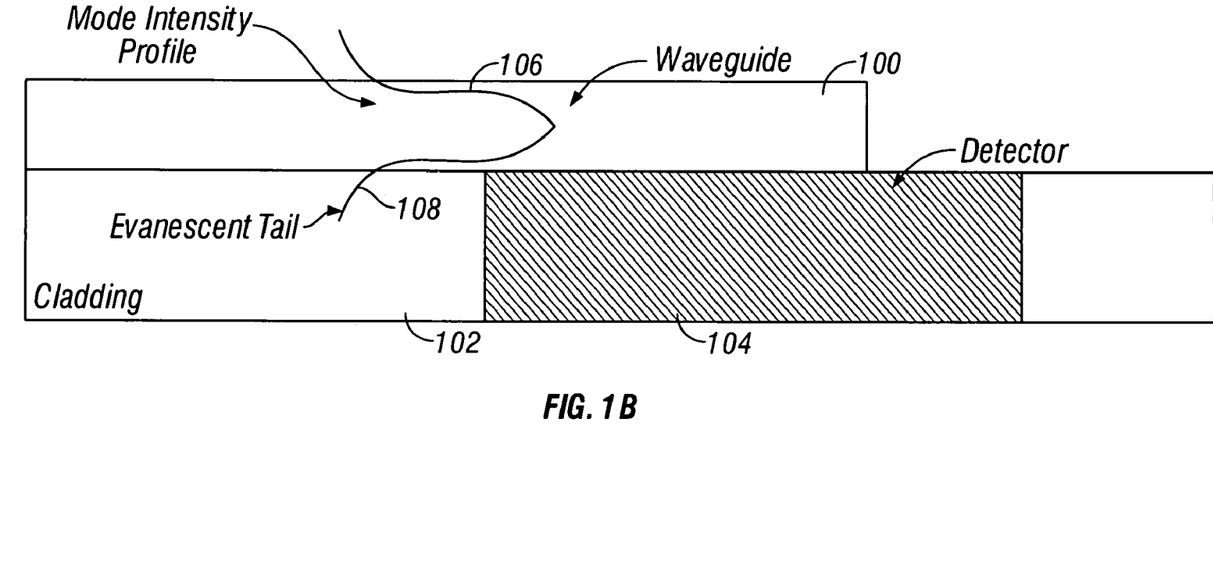

FIGS. 1A–1B illustrate a side view of a waveguide 100, a cladding layer 102, a detector 104 and a mode intensity light profile 106 with an evanescent "tail" 108 propagating through the waveguide 100. The mode "tail" 108 is a portion of a light mode 106 not confined to the waveguide core 100. The evanescent tail 108 of the mode 106 is a portion of light rays propagated in the waveguide core 100 that exponentially decay outside the waveguide core 100.

There are at least two problems that may arise in trying to evanescently couple light to a higher index, highly absorbing detector material 104. First, the detector material 104 may reflect and diffract the evanescent tail 108 (portion of light that is outside of the physical waveguide 100). Second, the guided mode 106 may be poorly coupled to the detector material 104, which decreases the absorption efficiency.

Figure 2:
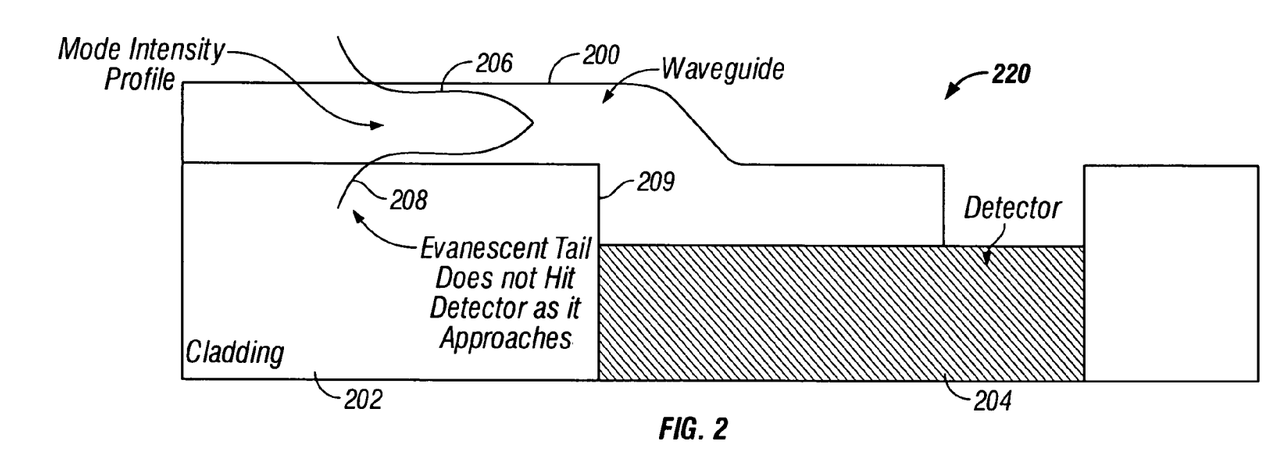
FIG. 2 illustrates a side view of another waveguide, another cladding layer with a step, a detector and another mode intensity profile propagating through the waveguide.

The present application relates to integrated evanescent coupled waveguide photodetectors and methods of fabricating these waveguide photodetectors, such as the integrated waveguide photodetector 220 in FIG. 2. The photodetector 220 may include a photodiode or a phototransistor. The configuration of the waveguide 200, cladding layer 202 and mirror 210 may reduce back reflection loss of light (optical backscatter) into the waveguide 200 and increase coupling efficiency.

FIG. 2 illustrates a side view of another waveguide 200, another cladding layer 208 with a step (also called an offset or sidewall) 209, a detector 204 and another mode intensity profile 206 with an evanescent tail 208 propagating through the waveguide 200. The tail 208 does not hit the detector 204 as the tail 208 approaches the detector 204.

Figure 3:
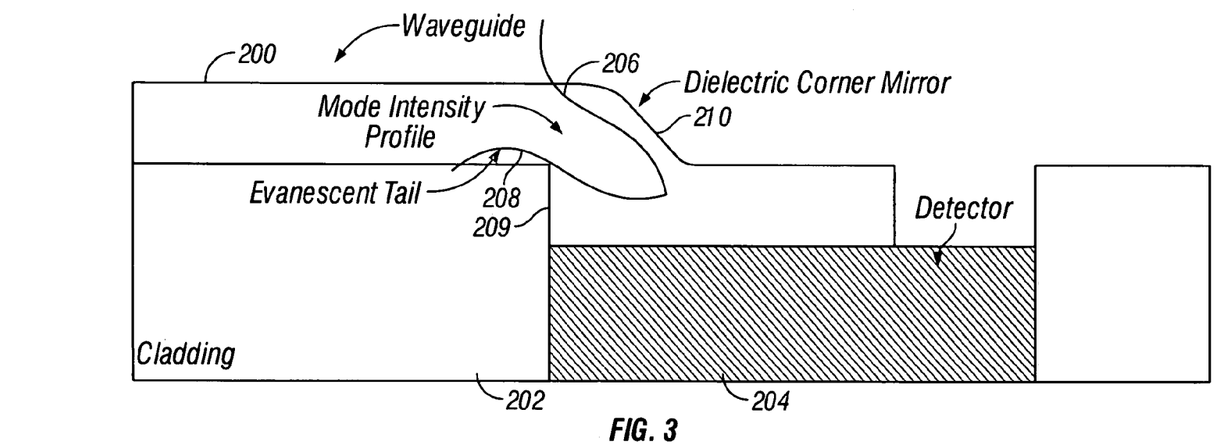
FIG. 3 illustrates the waveguide, cladding layer, detector and mode intensity profile through the waveguide in FIG. 2 at a different point in time.

FIG. 3 illustrates the waveguide 200, cladding layer 202, detector 204 and mode intensity profile 206 propagating through the waveguide 200 in FIG. 2 at a different point in time. The waveguide 200 has a dielectric corner mirror 210 that helps reflect light into the detector 204.

Figure 4:
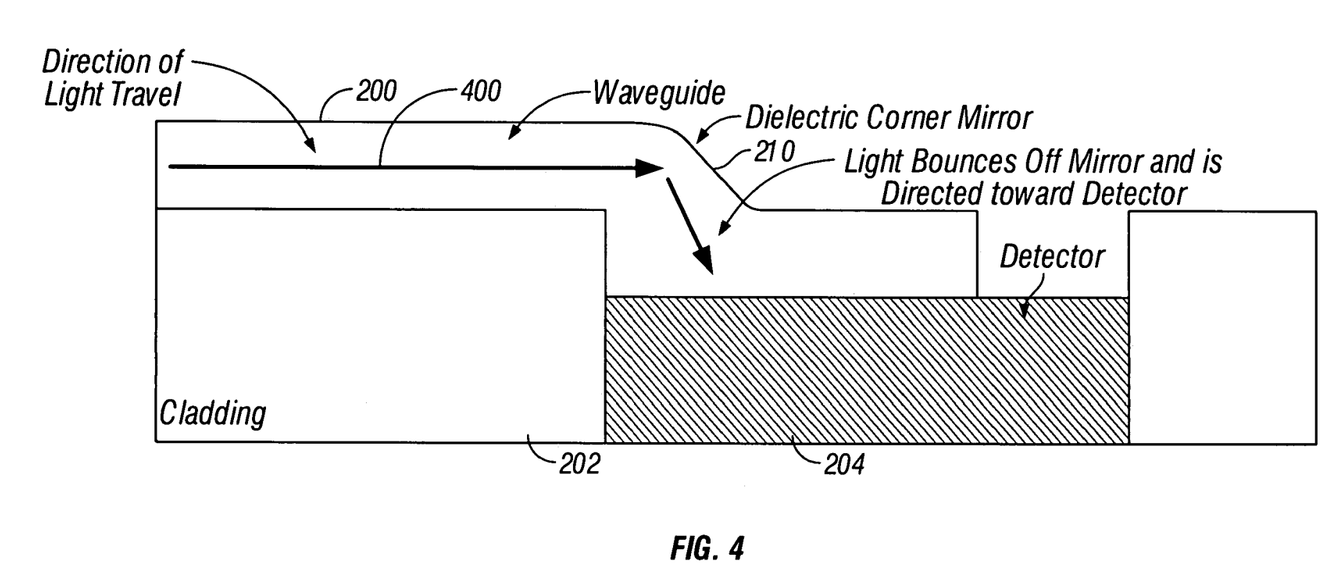
FIG. 4 illustrates the waveguide, cladding layer and detector in FIG. 3 and a direction of light travel.

FIG. 4 illustrates the waveguide 200, cladding layer 202 and detector 204 in FIG. 3 and a direction of light travel 400. The dielectric corner mirror 210 helps reflect and direct light into the detector 204.

The problems described above with FIGS. 1A–1B may be addressed in two ways. First, the cladding layer 202 (FIGS. 2–4) may have a relatively low index of refraction and may isolate the detector active material 204 from the incident evanescent mode tail 208, as shown in FIGS. 2–3. The light in FIG. 2 coming towards the detector 204 is represented by a mode profile 206, which shows the density of light within the guide 200. The tail 208 travels in the cladding 204, hits the high index detector material 204 and reflects/diffracts. The cladding layer 202 may reduce losses due to reflection and diffraction at the input to the detector region 204.

Second, the dielectric beveled corner mirror 210 (FIG. 3) may steer the light mode 206, guided through the waveguide core 200, into the detector material 204. The dielectric beveled mirror 210 may increase the coupling efficiency into the higher index, high loss detector material 204 by increasing the angles of incidence of light rays on the detector material 204.

However, some methods of fabricating this structure (detector 204 recessed within the cladding material 202 and with a dielectric corner mirror 210) may require several masking operations to create the offset 209 of the cladding 202 to the detector 204.

A method of fabricating described below may use a sacrificial layer to create the step offset 209 (FIG. 2) between the waveguide 200 and the photodetector 204. The method of fabrication may advantageously eliminate a mask operation. Also, the fabrication process may use chemical mechanical polishing (CMP), which may improve waveguide loss properties.

A two-mask approach may be used to solve fabrication problems associated with making an integrated waveguide/detector, such as the waveguide/detector system 220 in FIG. 2.

Figure 5A:
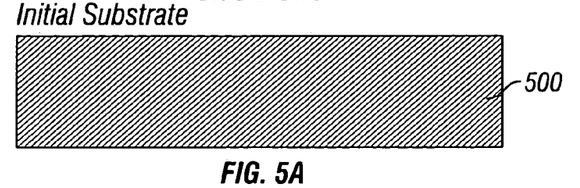
FIGS. 5A and 5B illustrate a side view and top view of an initial substrate upon which the waveguide and detector of FIGS. 2–4 may be fabricated.
Figure 5B:
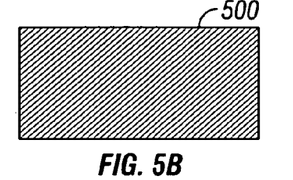

FIGS. 5A and 5B illustrate a side view and top view of an initial substrate 500. As an example, the substrate 500 may comprise Si or silicon-on-insulator (SOI).

Figure 6A:
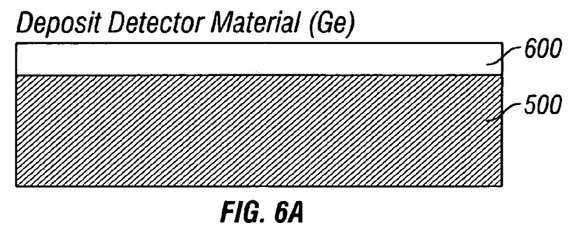
FIGS. 6A and 6B illustrate a side view and top view of a detector material deposited on the initial substrate of FIGS. 5A–5B.
Figure 6B:
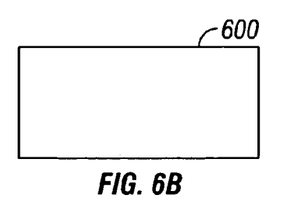

FIGS. 6A and 6B illustrate a side view and top view of a detector material/layer 600 deposited or otherwise formed on the initial substrate 500 of FIGS. 5A–5B. An example of the detector thickness may be about 0.3 to 2 microns. As an example, the detector material 600 may be made of Ge, InP, GaAs, other III–V materials, Si or other suitable materials. For example, Ge has an index of refraction of 4.5 at 850 nm.

Figures 13A, 13B:
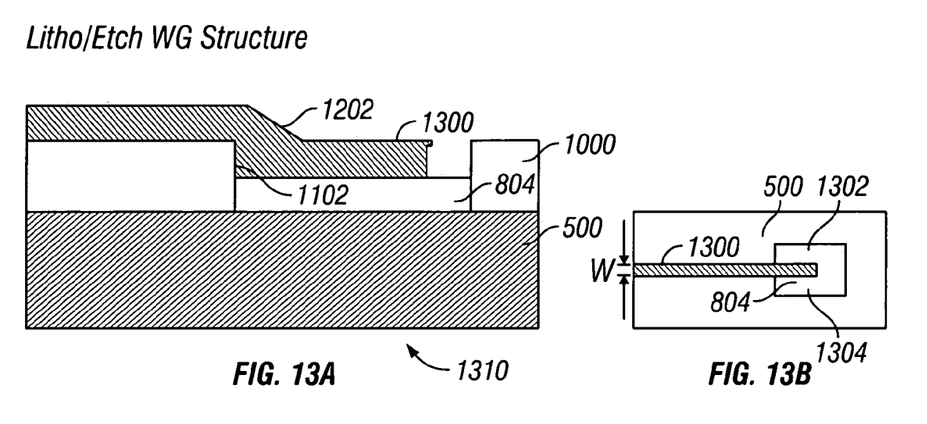
FIGS. 13A–13C illustrate a side view, top view and a front view of a defined and etched waveguide, the cladding material, detector and substrate of FIGS. 12A–12B.

If germanium is selected, the detector layer 600 may be deposited by chemical vapor deposition (CVD) performed with germane gas and a hydrogen carrier at 600° C. The germanium can be deposited in a CVD system such as the Epsilon® manufactured by ASM International or the Epi xP Centura® manufactured by Applied Materials. Germanium has an extinction coefficient of about 40 times that of silicon. The extinction coefficient is the fraction of light lost to scattering and absorption. A Ge detector 600 may allow a shorter base region 1320 in a detector 804 (FIG. 13C) needed to absorb and confine light propagated by a waveguide core 1300 (FIG. 13A).

The detector material 600 may later have two doped regions to form a complementary metal oxide semiconductor (CMOS) compatible photodetector, phototransistor or photodiode.

If the detector material 600 comprises Si (preferred with a SOI structure), the substrate layer 500 will be oxide and the detector material 600 will be Si. In this configuration, the first process of depositing a detector material may be omitted. Si may be the detector material 600 for wavelengths>1.1 micron.

The detector 600 in FIGS. 6A and 6B may be fabricated with standard processes used to make a P-I-N, M-S-M detector or a P-N-P or N-P-N phototransistor, as described below with FIG. 13B. P-I-N stands for p-doped, intrinsic, and n-doped. P-I-N refers to a diode structure. M-S-M refers to Metal-Semiconductor-Metal, where the metal forms rectifying contacts. These processes are not shown and may be known to those of ordinary skill in the art.

Figure 7A:
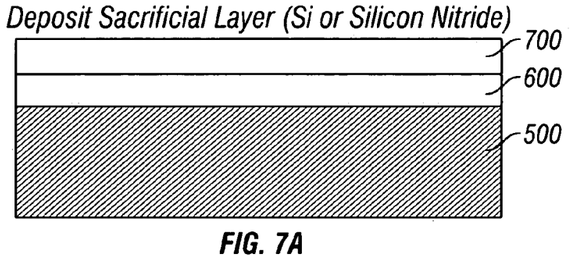
FIGS. 7A and 7B illustrate a side view and top view of a sacrificial layer deposited on a detector material, which was formed on the initial substrate of FIGS. 5A–5B.
Figure 7B:
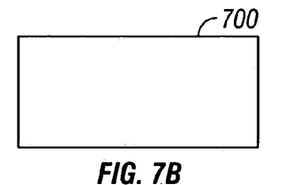

FIGS. 7A and 7B illustrate a side view and top view of a sacrificial layer 700 (also called etchable layer) deposited or otherwise formed on top of the detector material/layer 600 in FIGS. 6A–6B. An example of the sacrificial layer's thickness may be about 0.3 to 1 micron. The "sacrificial layer" 700 may be any material that can be selectively etched to leave behind a cladding layer 1000 (e.g., $SiO_2$) (described below with FIGS. 10A and 11A) and a detector section 804. The sacrificial layer 700 may be Si because Si may be deposited in the same tool as a Ge detector layer 600. Also, Si may be readily etched in Tetramethylammonium Hydroxide (TMAH), while Ge and $SiO_2$ may not be readily etched in TMAH.

After the sacrificial layer 700 is deposited in FIG. 7A, a mesa structure 800 may be photolithographically defined and etched through both the sacrificial layer 700 and detector layer 600.

Figure 8A:
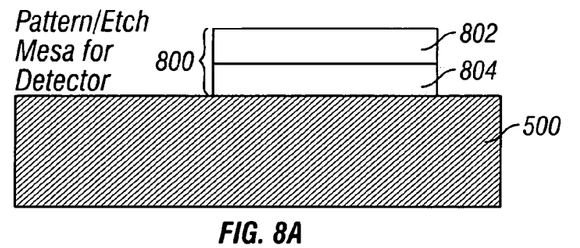
FIGS. 8A and 8B illustrate a side view and top view of an etched mesa structure on the initial substrate of FIGS. 5A–5B.
Figure 8B:
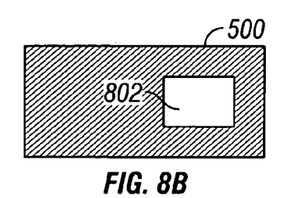

FIGS. 8A and 8B illustrate a side view and top view of an etched mesa structure 800 on the initial substrate 500 of FIGS. 5A–5B. An example of the mesa structure may be about 2 to 5 microns wide, about 2 to 10 microns long, and about 0.3 to 2 microns high. The mesa structure 800 includes an etched sacrificial section 802 and a detector section 804. The structure 800 may be formed by dry etching, such as by a chlorine/hydrogen bromide chemistry.

Figure 9A:
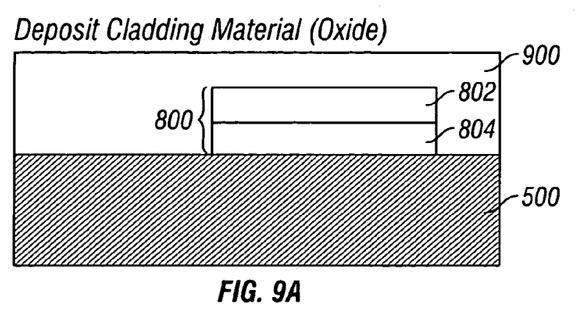
FIGS. 9A and 9B illustrate a side view and top view of a cladding material over the mesa structure and initial substrate of FIGS. 8A–8B.
Figure 9B:
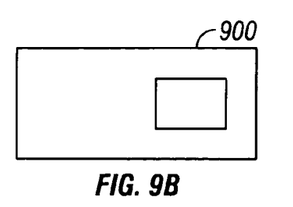

FIGS. 9A and 9B illustrate a side view and top view of a cladding material/layer 900 blanket deposited conformally (e.g., by plasma enhanced chemical vapor deposition (PECVD)) over the mesa structure 800 and initial substrate 500 of FIGS. 8A–8B. The cladding material 900 may be $SiO_2$ with an index of refraction lower than the waveguide 202, 302, such as n=1.5.

Figure 10A:
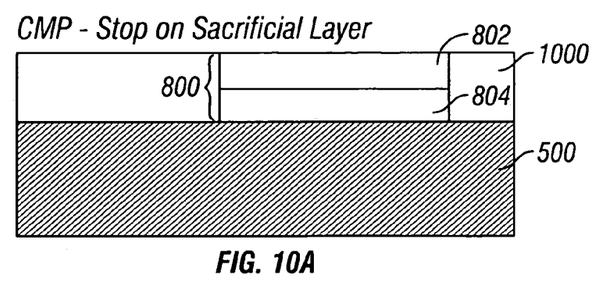
FIGS. 10A and 10B illustrate a side view and top view of a planarized and polished cladding material, mesa structure and initial substrate of FIGS. 9A–9B.
Figure 10B:
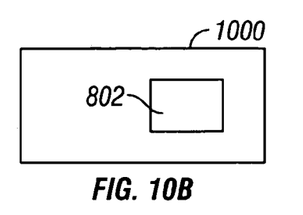

FIGS. 10A and 10B illustrate a side view and top view of a planarized and polished cladding material 1000, which is substantially even with the mesa structure 800 of FIGS. 9A–9B. The oxide cladding material 900 in FIG. 9A may be planarized, (e.g., by a wet etch-back process, such as etching with hydrofluoric acid (HF) until the Si sacrificial layer is exposed) or polished (e.g., by chemical mechanical polishing) until the Si sacrificial layer 700 in the detector mesa 800 is reached.

An example of the cladding layer thickness in FIG. 10A may be 0.3 to 1 micron. The thickness of the planarized cladding layer 1000 may be selected to be equal to or thicker than an evanescent tail 208 in FIG. 2 of a mode 206 transmitted along a waveguide core 1300 (FIG. 13) formed and etched over the cladding layer 1000. The cladding layer 1000 prevents the evanescent tail 208 from reaching the detector section 804, which may be a lossy detector material. Preventing the evanescent tail 208 from reaching the detector section 804 (a) reduces the amount of background noise, i.e., amount of scattered light, which can affect other transistors, (b) increases the speed of a phototransistor, and (c) reduces the amount of extraneous light reflected from the detector section 804, which reduces the amount of light necessary to turn on the transistor.

Figure 12A:
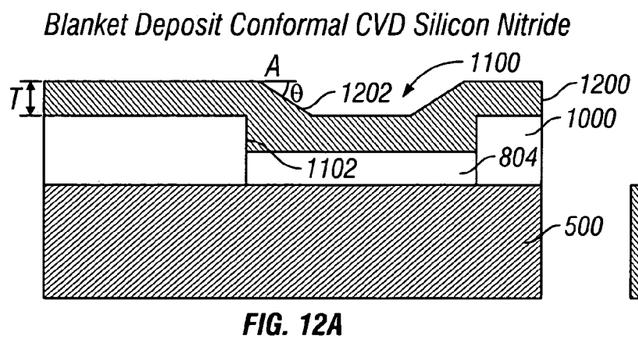
FIGS. 12A and 12B illustrate a side view and top view of a waveguide film, the planarized cladding material, detector and initial substrate of FIGS. 11A–11B.

The planarization exposes the sacrificial material section 802 and may also provide a very smooth surface on the cladding layer 1000, which will serve as a bottom of the waveguide layer 1200 in FIG. 12A. A waveguide with a smooth surface may be desired for low optical loss.

Figure 11A:
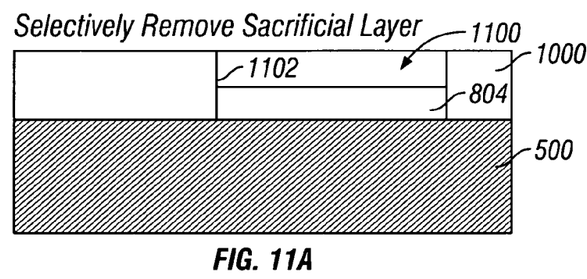
FIGS. 11A and 11B illustrate a side view and top view of the planarized cladding material, detector and initial substrate of FIGS. 10A–10B.
Figure 11B:
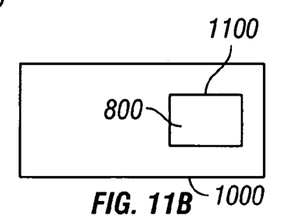

The sacrificial Si layer 802 may be removed in TMAH, while the cladding layer 1000 and detector 804 are left intact, as shown in FIG. 11A. FIGS. 11A and 11B illustrate a side view and top view of the planarized cladding material 1000, detector 804 and initial substrate 500 of FIGS. 10A–10B. The removed sacrificial layer 802 may leave a space or window 1100 in the cladding layer 1000 over the detector mesa 804. The cladding layer 1000 has a step or offset 1102, which may be 0.3 microns in height. The offset 1102 may reduce reflection and scatter from the detector section 804.

Figure 12B:
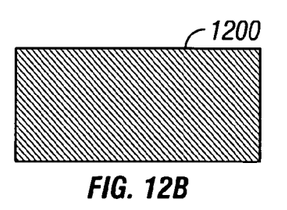

FIGS. 12A and 12B illustrate a side view and top view of a waveguide film/layer 1200, the planarized cladding material 1000, detector 804 and initial substrate 500 of FIGS. 11A–11B. The waveguide film/layer 1200 may be deposited or otherwise formed over the planarized cladding material 1000 and detector 804. The waveguide 1200 may be made of silicon, SOI, silicon nitride, silicon oxynitride or other materials suitable for light propagation.

The waveguide film 1200 may have an index of refraction (n) higher than the cladding 1000, e.g., greater than 1.5 or 1.9. For example, the waveguide film 1200 may comprise Silicon Nitride with an index of refraction of 2.0 at 850 nm. The large difference between the waveguide's relatively high index of refraction and the cladding layer's relatively low index of refraction helps confine light transmitted through the finished waveguide core 1300 (FIG. 13A). The waveguide layer 1200 is optically transparent in the wavelength region at which the completed device is to operate, for example, optically transparent for light having a wavelength of 850 nm.

The waveguide film 1200 may be deposited conformally using a chemical vapor deposition (CVD) technique, such as PECVD using precursors of silane and nitrogen. An example of the waveguide's thickness may be 0.3 microns. The conformal nature of the waveguide film deposition may allow light to be "forced" downward into the detector/phototransistor 804 when light travels in the finished waveguide core 1300 and over a step 1102 left behind when the sacrificial layer 802 is removed (FIG. 11A).

An angle φ may extend from a top surface "A" of the waveguide layer 1200 over the cladding layer 1000 and the waveguide's top surface "B" over the step offset 1102 of the cladding layer 1000. The slope of waveguide top surface "B" in cladding layer window 1100 defines a beveled mirror 1202. Angle φ may be selected such that a mode 206 (FIG. 2) traveling through the finished waveguide core 1300 undergoes total internal reflection off the beveled mirror 1202 and is directed into the detector section 804. A critical angle of incidence $\theta_c$ may be defined as:

$$\theta_c = \sin^{-1}(n2/n1)$$

where n1=refractive index of medium through which light is propagated, e.g., waveguide core 1300, and n2= refractive index of proximate medium, e.g., cladding layer 1000. Angle φ is, for example, 25°. Then, any angle φ greater than 25° would cause total internal reflection and propagated light would be confined to the waveguide core 1300.

Figure 13C:
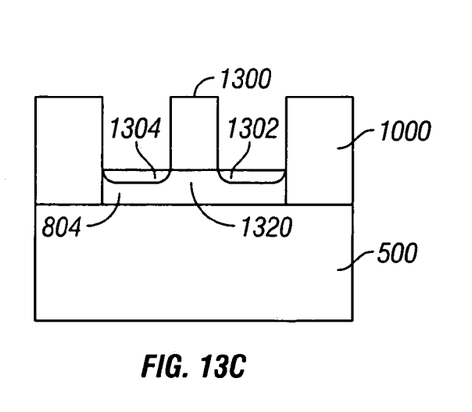

FIGS. 13A–13C illustrate a side view, top view and a front view of a defined and etched waveguide core 1300, the cladding material, the cladding material 1000, detector 804 and substrate 500 of FIGS. 12A–12B. The waveguide 1200 in FIG. 12A may be photolithographically defined (deposit photoresist layer and pattern over waveguide 1200) and etched (e.g., dry etch) to form the waveguide core 1300. If the waveguide layer 1200 comprises silicon nitride, the dry etch can be performed with a gas mixture such as difluoromethane/oxygen ($CH_2F_2/O_2$). A portion of the waveguide layer 1200 covered by photoresist is not etched away, thereby forming a waveguide core 1300. The waveguide core 1300 extends over the cladding layer 1000 and is in contact with the detector section 804.

The waveguide core 1300, for example, may have a width W of 0.3 μm. Waveguide core thickness T and width W may be determined by the mode type to be propagated through the waveguide core 1300 during use. For single mode propagation, thickness T and width W need to be below the cutoff for the first mode and above the cutoff for a second mode. Waveguide core thickness T and width W may be considerably smaller than the free-space wavelength of light, having a maximum of about 0.35 μm.

An emitter and a collector (not shown) may be formed in the detector section 804, one on each side 1302, 1304 (FIG. 13B) of the waveguide core 1300. The emitter and collector may be formed by implanting ions and using the waveguide core 1300 as a mask. If the detector section 804 is a p-type material, n-type ions are implanted to form an emitter and collector. The emitter and collector may each have a junction depth of, e.g., 0.3 μm. For example, phosphorus ions may be implanted, with a dose of 10E14 atoms/centimeter-squared (atoms/$cm^2$), and an energy of 20 kilo-electron volts (keV). Alternatively, the emitter and collector can be implanted with other types of n-type ions, such as arsenic, with a dose of 10E14 atoms/$cm^2$, and an energy of 80–100 keV.

A lateral phototransistor is thereby formed, with an n-type emitter, an n-type collector, and a p-type base 1320, where the p-type base 1320 (FIG. 13C) is in the detector section 804 under the waveguide core 1300. The P-type base 1320 may have a length of, e.g., 5.5 μm.

Other configurations may be implemented, such as a p-type emitter, a p-type collector, and a n-type base. As another example, region 1302 may implanted with p-type ions, region 1304 may be implanted with n-type ions, and the waveguide core 1300 may comprise an intrinsic, undoped silicon. This example forms a P-I-N photodiode.

A top cladding layer (not shown) may be formed over the entire structure 1310 to minimize light scattering out of the waveguide 1300. For example, the top cladding layer may be silicon dioxide or another oxide layer, which may be deposited by PECVD to a thickness of 0.8 to 1 micron. Alternatively, the top cladding layer may be deposited by high-density plasma (HDP) deposition. Openings may be photolithographically defined and etched to the emitter and collector formed in the detector section 804. Metal and an adhesion layer may be deposited in the openings to contact the emitter and collector.

Figure 14:
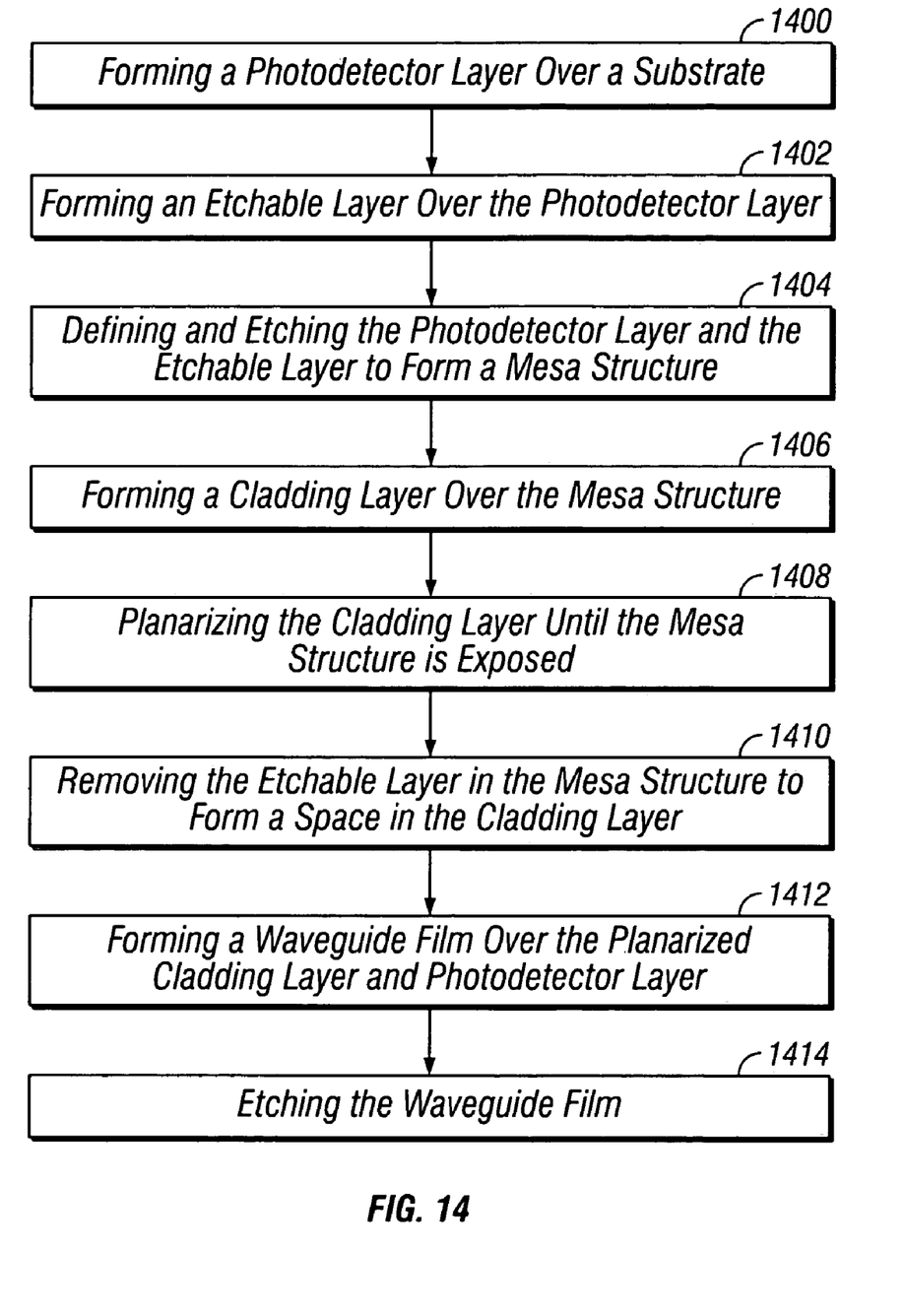
FIG. 14 illustrates a method of fabricating a waveguide-detector as described herein.

FIG. 14 illustrates the method of fabricating a waveguide-detector as described above.

The efficient coupling of a mode propagating through waveguide core 1300 to a base 1320 in the detector 804 may reduce a length of the base 1320 needed to absorb and confine light propagated by a waveguide core 1300. The efficiency of the coupling is also improved by (a) the offset distance 1102 of waveguide core 1300 from detector 804, and by (b) the beveled mirror 1202. The beveled mirror 1202 confines the mode in the waveguide core 1300 and steers/directs the mode into the base 1320 in the detector 804.

During operation, a phototransistor formed by the waveguide core 1300 and detector 804 amplifies induced photocurrent. Light transmitted by the waveguide core 1300 is absorbed in the base 1320 of the detector 804 underneath the waveguide core 1300, which creates electron-hole pairs. A collector 1302 or 1304 has a positive bias, and photogenerated electrons in the base 1320 are swept into the collector. As holes are generated in the base 1320, the electrons are prevented from traversing the base 1320 and entering the emitter 1302 or 1304. These holes charge the base 1320 near the emitter and lowers the emitter-base barrier, i.e., lowering the barrier for electron emission from the emitter into the base 1320. The phototransistor is thereby switched "on" with a large current between the emitter and collector, and amplifies a measured photocurrent. The emitter/collector current is equal to the induced photocurrent times the gain of phototransistor. The relatively small base 1320 and emitter sizes may result in fast response times.

FIGS. 15–21 illustrate an alternative method to fabricate the integrated waveguide/photodetector of FIGS. 2A–4 using a damascene process to define the waveguide. "Damascene" refers to etching into a first material and blanketing a second material over a whole surface of the first material, including the etched space. Then the method polishes back the second material such that all the unwanted second material is removed except the second material in the etched space(s).

Figure 15:
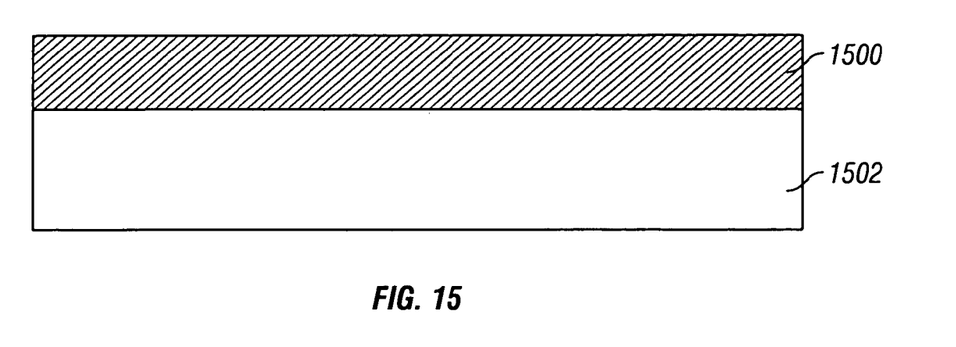
FIGS. 15–21 illustrate an alternative method to fabricate the integrated waveguide/photodetector of FIGS. 2A–4 using a damascene process to define the waveguide.

FIG. 15 illustrates a detector material 1500, such as Ge, deposited on a substrate.

Figure 16:
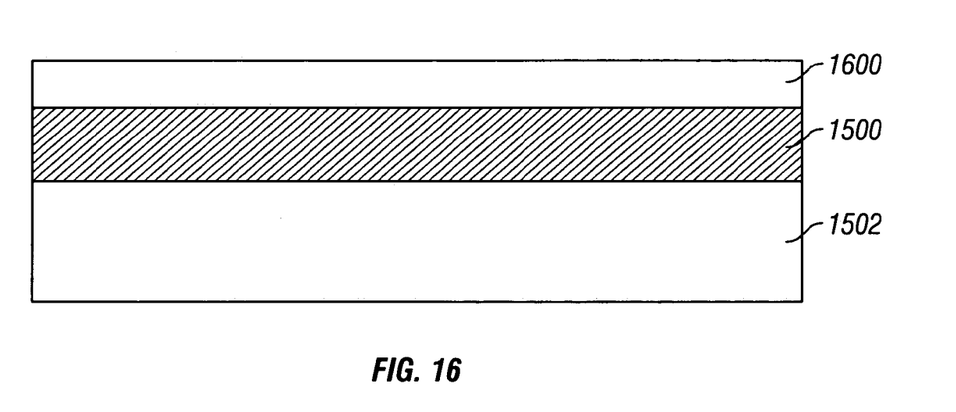

FIG. 16 illustrates a sacrificial layer 1600, such as Silicon, deposited on the detector material 1500.

Figure 17:
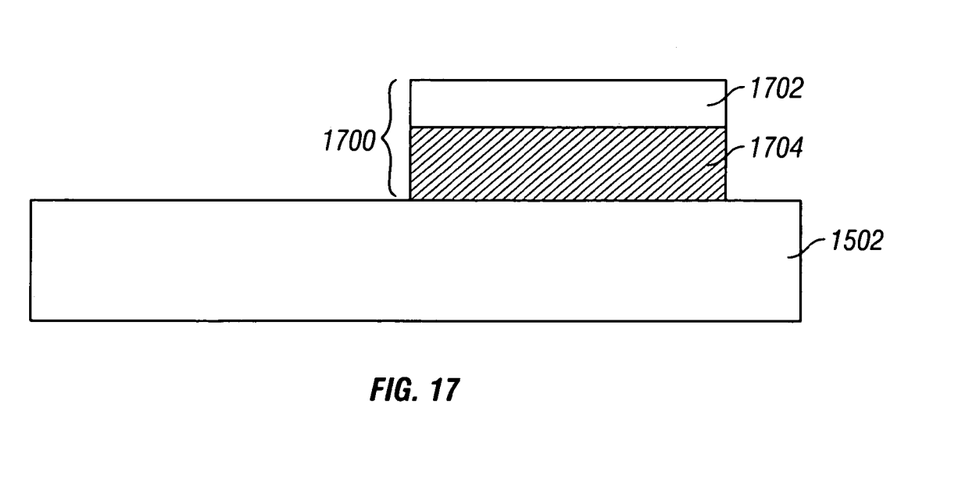

FIG. 17 illustrates a detector mesa 1700, which includes a sacrificial section 1702 and a detector section 1704. The detector mesa 1700 may be formed by lithography and etching.

Figure 18:
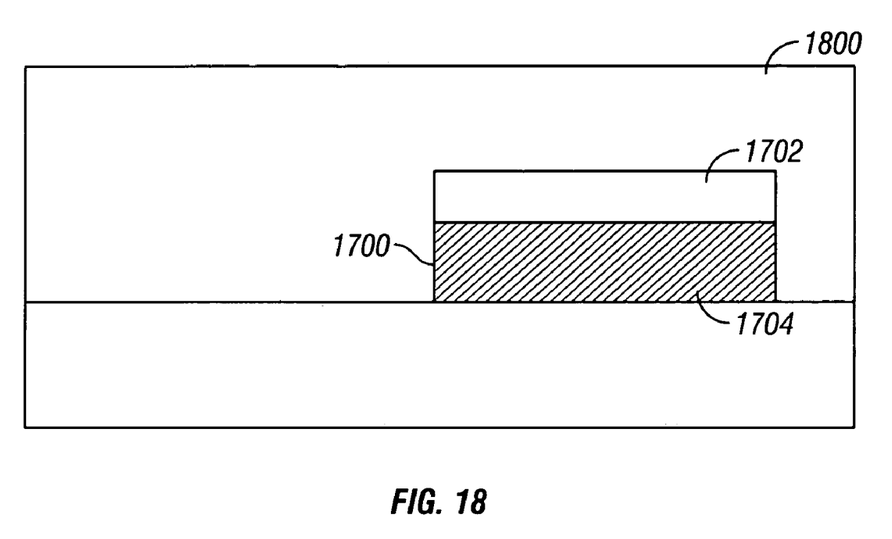

FIG. 18 illustrates a cladding layer 1800, such as an oxide, deposited on the detector mesa 1700.

Figure 19:
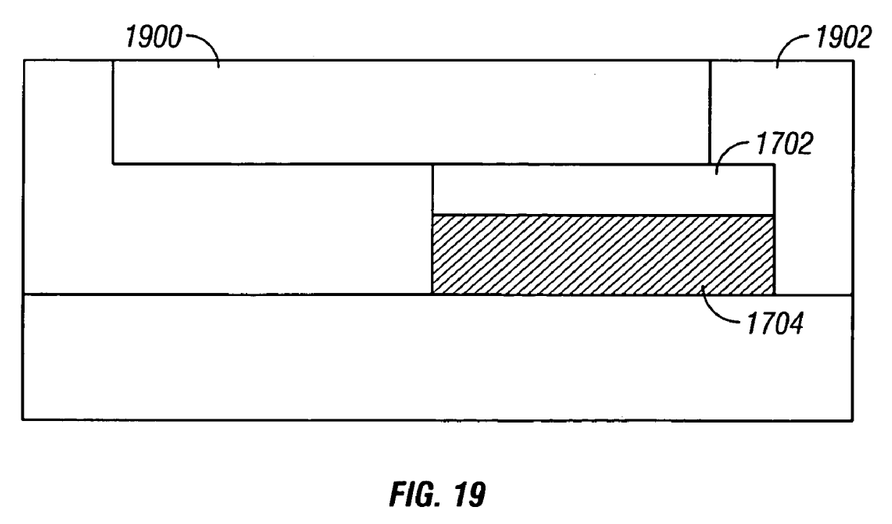

FIG. 19 illustrates a waveguide channel 1900 in the cladding layer 1902 that may be formed by lithography and etching.

Figure 20:
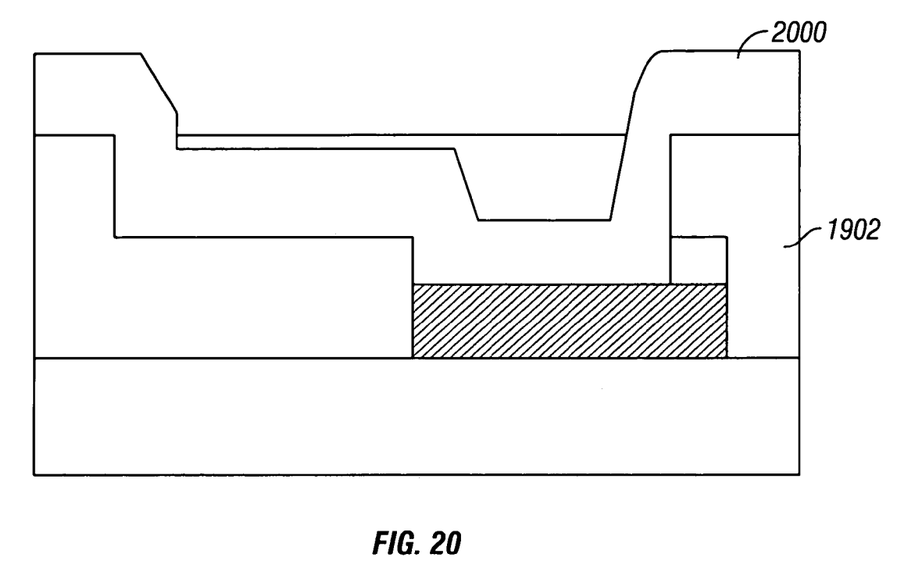

FIG. 20 illustrates a portion of the sacrificial section 1702 selectively removed, e.g., by a wet etch process. A waveguide material 2000 is blanket deposited over the cladding 1902, in the waveguide channel 1900 of FIG. 19 and in the space formerly occupied by the removed sacrificial section.

Figure 21:
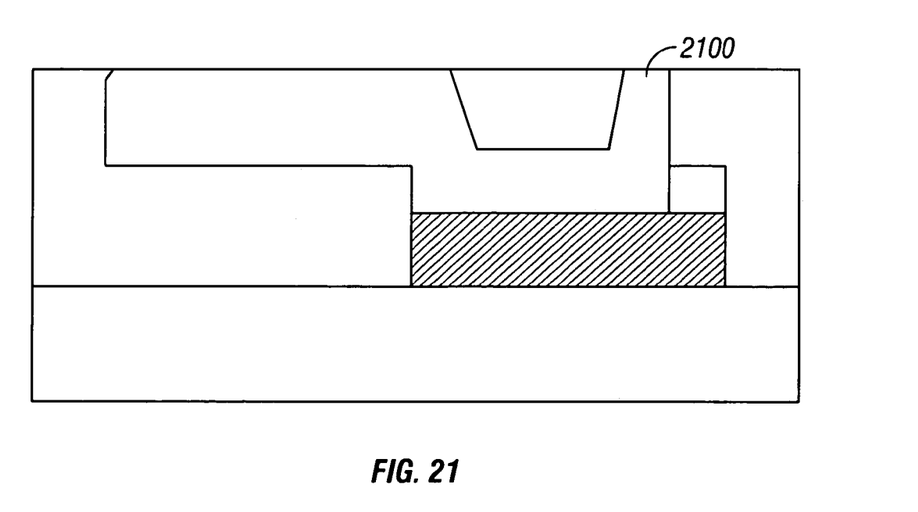

FIG. 21 illustrates a damascene waveguide 2100 that may be defined by Chemical Mechanical Polishing (CMP).

A number of embodiments have been described. Nevertheless, it will be understood that various modifications may be made without departing from the spirit and scope of the application. For example, an attenuating layer may be added on top of the detector 804 and under the waveguide layer 1200.

The waveguides described herein may be made of any medium transparent to a wavelength of light and having a cladding with a lower index of refraction. Examples of waveguide materials include silicon, the thin silicon layer in SOI (silicon on insulator), glass, oxides, nitrides, e.g., silicon nitride, polymers, semiconductors or other suitable materials.

The optical photodetectors described herein may be selected from a number of materials in which light induces electrical carriers (electrons and holes) usually through an absorption process, and the carriers can be collected and converted to current. Examples of photodetector materials include Ge, InP, GaAs, other II–VI materials, Si, polymer or other suitable materials.

Accordingly, other embodiments are within the scope of the following claims.

What is claimed is:

1. A method comprising:
   forming an etchable layer over a photodetector layer;
   etching the photodetector layer and the etchable layer to form a mesa structure;
   forming a first cladding layer over the mesa structure;
   planarizing the cladding layer until the mesa structure is exposed;
   removing the etchable layer in the mesa structure to form a space defined by the cladding layer and the photodetector layer;
   forming a waveguide film over the planarized cladding layer and the photodetector layer; and
   etching the waveguide film.

2. The method of claim 1, further comprising forming a photodetector layer over a substrate.

3. The method of claim 2, wherein forming the photodetector layer comprises depositing a Germanium layer over a substrate.

4. The method of claim 1, wherein forming the etchable layer comprises depositing Silicon over the photodetector layer.

5. The method of claim 1, wherein etching the photodetector layer and the etchable layer comprises photolithography and etching.

6. The method of claim 1, wherein forming the cladding layer over the mesa structure comprises blanket depositing the cladding layer conformally over the mesa structure.

7. The method of claim 1, wherein the cladding layer comprises $SiO_2$.

8. The method of claim 1, wherein the planarizing of the cladding layer comprises polishing the cladding layer until the mesa structure is exposed.

9. The method of claim 8, further comprising using chemical mechanical polishing to perform the polishing.

10. The method of claim 1, wherein planarizing the cladding layer forms a substantially smooth surface.

11. The method of claim 1, wherein the waveguide film comprises Silicon Nitride.

12. The method of claim 1, wherein forming the waveguide film uses a chemical vapor deposition (CVD) technique.

13. The method of claim 1, further comprising forcing light downward into the photodetector when light travels in the waveguide and over a step left behind when the etchable layer is removed.

14. The method of claim 1, wherein etching the waveguide film involves photolithography.

15. The method of claim 1, further comprising forming a second cladding layer over the waveguide, photodetector layer, and first cladding layer.

16. The method of claim 1, further comprising forming a beveled mirror on the waveguide film over a portion of the photodetector layer.

17. The method of claim 1, further comprising implanting ions in two regions of the photodetector layer.

18. A method comprising:
depositing an etchable layer over a photosensitive layer on a substrate;
removing portions of the photosensitive layer and the etchable layer to form a mesa structure;
forming a cladding layer over the mesa structure;
removing a portion of the cladding layer until the mesa structure is exposed;
removing the etchable layer in the mesa structure to form a window in the cladding layer;
forming a waveguide layer over the cladding layer and photosensitive layer; and
removing a portion of the waveguide layer.

19. The method of claim 18, wherein removing the etchable layer in the mesa structure to form a window in the cladding layer comprises forming a step.

20. A process comprising:
depositing a detector layer on a substrate;
depositing a sacrificial layer on the detector layer;
etching the detector layer and sacrificial layer to form a detector mesa;
depositing a cladding layer over the detector mesa and substrate;
etching the cladding layer to form a channel to the sacrificial layer;
selectively removing a portion of the sacrificial layer to form a window;
depositing a waveguide material over the cladding layer, in the channel and in the window to contact the detector layer.

21. The method of claim 20, wherein selectively removing a portion of the sacrificial layer comprises a wet etch process.

22. The method of claim 20, further comprising defining the waveguide with Chemical Mechanical Polishing.

23. The method of claim 1, wherein the planarizing of the cladding layer comprises etching the cladding layer in a wet etching process until the mesa structure is exposed.

24. The method of claim 23, further comprising using a hydrofluoric acid to perform the etching.

* * * * *